United States Patent [19]

Izukawa et al.

[11] Patent Number: 4,678,956

[45] Date of Patent: Jul. 7, 1987

[54] VIBRATION WAVE MOTOR

[75] Inventors: Kazuhiro Izukawa, Yokohama; Takayuki Tsukimoto, Fujisawa; Ichiro Okumura, Yokohama, all of Japan

[73] Assignee: Canon Kabushiki Kaisha, Tokyo, Japan

[21] Appl. No.: 697,937

[22] Filed: Feb. 4, 1985

[30] Foreign Application Priority Data

Feb. 10, 1984 [JP] Japan .................................. 59-24022

[51] Int. Cl.⁴ ........................................... H01L 41/08
[52] U.S. Cl. .................................... 310/323; 310/328; 310/358; 310/359; 310/366; 310/317
[58] Field of Search ............... 310/323, 328, 366, 317, 310/358, 359

[56] References Cited

U.S. PATENT DOCUMENTS

| 3,114,849 | 12/1963 | Poschenrieder | 310/359 |
| 3,252,017 | 5/1966 | Bartels | 310/359 X |
| 3,365,592 | 1/1968 | Krautwald et al. | 310/359 X |
| 4,019,073 | 4/1977 | Vishnevsky et al. | 310/359 |
| 4,400,641 | 8/1983 | Vishnevsky et al. | 310/323 |
| 4,491,761 | 1/1985 | Grudkowski et al. | 310/359 |
| 4,510,411 | 4/1985 | Hakamata et al. | 310/323 X |
| 4,513,219 | 4/1985 | Katsuma et al. | 310/328 |
| 4,562,374 | 12/1985 | Sashida | 310/328 |

Primary Examiner—Mark O. Budd
Attorney, Agent, or Firm—Fitzpatrick, Cella, Harper & Scinto

[57] ABSTRACT

A vibration wave motor uses electrostrictive vibrator elements itself as a vibration member, and the rotor of the motor is driven by contacting the electrostrictive vibrator to the rotor.

4 Claims, 23 Drawing Figures

VIBRATION WAVE MOTOR

BACKGROUND OF THE INVENTION

1. Field of the Invention

The present invention relates to a vibration wave motor which is driven by a travelling vibration wave.

2. Description of the Prior Art

A vibration wave motor which is driven by a travelling wave motor and which has been recently put into practice is explained with reference to FIG. 1, in which numeral 1 denotes an electrostrictive element such as PZT (tinatate zirconum acid lead) and numeral 2 denotes a vibration member mode of an elastic material to which the electrostrictive element 1 is bonded. The vibration member 2 and the electrostrictive element 1 are held on a base 9 through a vibration absorber 4. Numeral 3 denotes a movable member which is rotatably supported by a stationary shaft 10 through a bushing 14. The stationary shaft 10 has its lower end mounted to the base 9 and its upper end threaded. A spring 16 is fitted to the stationary shaft 10 above the bushing 14 and a nut 18 is screwed over a washer 17. In this manner, the movable member 3 is urged to the vibration member 2.

FIG. 2 is a side elevational view showing a relation between the electrostrictive element 1 and the vibration member 2. The electrostrictive element 1 has a plurality of devices $1a_1, 1a_2, 1a_3, \ldots$ and $1b_1, 1b_2, 1b_3, \ldots$ bonded thereto and the group of electrostrictive devices $1a_1, 1a_2, 1a_3, \ldots$ and the group of electrostrictive devices $1b_1, 1b_2, 1b_3, \ldots$ are arranged to be shifted by one quarter of wavelength $\lambda$ of the vibration wave from each other. In the group of electrostrictive devices $1a_1, 1a_2, 1a_3, \ldots$, the devices are arranged at a pitch of one half of the wavelength with adjacent devices being oppositely polarized. Symbols + and − indicate polarities. In the other group of electrostrictive devices $1b_1, 1b_2, 1b_3, \ldots$, the devices are arranged at a pitch of one half of the wavelength with adjacent devices being oppositely polarized. Alternatively, one electrostrictive element which is as large as the array of those electrostrictive devices may be polarized at the above pitch. Electrodes for applying a voltage are formed on the opposite polarized surfaces of the electrostrictive element by evaporation or printing.

In the vibration wave motor thus constructed, a voltage is applied from an A.C. power supply 20 thicknesswise (in the direction of polarization) of the electrostrictive element 1 is shown in FIGS. 3 and 4. In FIG. 3, when a positive (forward HA) voltage is applied from the drive power supply 20 to the electrostrictive device $1a_2$ in the direction of polarization, the electrostrictive device $1a_2$ expands in the direction of electric field or thickness wise and shrinks in the direction normal to the direction of electric field (arrow A). Since the voltage of the opposite polarity is applied to the adjacent electrostrictive element $1a_1$, it shrinks in the direction of electric field and expands in the direction normal to the direction of electric field (arrow B). In this manner, the respective electrostrictive devices expand and shrink. Since the vibration member 2 is bonded in union to the electrostrictive element 1, the expansion and shrinkage are propagated to the vibration member 2 so that it is bent as shown in FIGS. 4A and 4B. FIG. 4A shows a bending state when the forward voltage is applied to the electrostrictive device $1a_2$ and the reverse voltage is applied to the electrostrictive device $1a_1$. FIG. 4B shows a bending state when the reverse voltage is applied to the electrostrictive device $1a_2$ and the forward voltage is applied to the electrostrictive device $1a_1$.

An A.C. voltage $V_0 \sin \omega t$ is applied to one group of electrostrictive devices $1a_1, 1a_2, 1a_3, \ldots$ of the electrostrictive element and an A.C. voltage $V_0 \cos \omega t$ is applied to the other group of electrostrictive devices $1b_1 1b_2, 1b_3, \ldots$. Accordingly, A.C. voltages having a phase difference of 180° between adjacent devices in the polarization direction and a phase difference of 90° between the groups are applied to the respective electrostrictive devices, and the electrostrictive devices expand and shrink. As this vibration is propagated to the vibration member 2, the vibration member 2 makes a bending vibration in accordance with the pitch of arrangement of the electrostrictive devices. When the vibration member 2 protrudes at the positions of the alternate electrostrictive devices, it recesses at the positions of other alternate electrostrictive devices. On the other hand, since one group of electrostrictive devices are shifted by one quarter of wavelength relative to the other group and the phases of the bending vibrations are shifted by 90° from each other, the vibration waves are combined and travel. During the application of the A.C. voltage, the vibrations are sequentially generated and propagated through the vibration member 2 as the travelling bending vibration wave.

The waves under this condition are shown in FIGS. 5A, 5B, 5C and 5D. Let us assume that the travelling bending vibration wave travels in a direction of an arrow $X_1$. A center plane of the vibration member in a quiescent state in shown by 0 and that in a vibration state is shown by a chain line. In the neutral plane 6, the bending stress is balanced. In sectional planes $7_1, 7_2, 7_3$; and normal to the neutral plane 6, no stress is applied on a crossing line 5, of those planes and it merely vibrates vertically. The sectional plane $7_1$ makes a lateral pendulum motion around the crossing line $5_1$. In FIG. 5A, a point $P_1$ on a crossing line of the sectional plane $7_1$ and the surface of the vibration member 2 facing the movable member 1 is a right dead center of the lateral vibration and vibrates only vertically. In this pendulum motion, when the crossing lines $5_1, 5_2$ and $5_3$ are on the positive side of the wave (above the center plane 0), a leftward (opposite to the travel direction $X_1$ of the wave) stress is applied, and when they are on the negative side of the wave (below the center plane 0), a rightward stress is applied. In FIG. 5A, the crossing line $5_2$ and the sectional plane $7_2$ show the former state and the stress shown by an arrow is applied to a point $P_2$, and the crossing line $5_3$ and the sectional plane $7_3$ show the latter state and the stress shown by an arrow is applied to a point $P_3$. As the wave travels and the crossing line $5_1$ comes to the positive side of the wave as shown in FIG. 5B, the point $P_1$ moves leftward and upward. In FIG. 5C, the point $P_1$ moves only leftward at the upper dead center of the vertical vibration. In FIG. 5D, the point $P_1$ moves leftward and downward. As the wave further travels, the state of FIG. 5A is restored through the rightward and downward motion and the rightward and upward motion. Through the combination of the series of motions, the point $P_1$ makes a rotating elliptic motion. As shown in FIG. 5C, the rotating elliptic motion is in a direction shown in FIG. 5C on a tangential line of the point $P_1$ to the movable member 3 and the movable member 3 is frictionally driven in a direction $X_2$ by the motion of the point $P_1$. All points on the vibration member 2 sequentially frictionally drives the movable member 3 as the point $P_1$ does.

This vibration wave motor does not have a performance which sufficiently meets requirements for a drive efficiency and durability. One of the causes therefor is that the electrostrictive element 1 is bonded to the vibration member 2. The vibration member 2 makes the bending vibration because only one side of the rigid vibration member 2 which is hardly expanded or shrinked is expanded or shrinked in the plane direction by the electrostrictive element 1. Accordingly, in the prior art vibration wave motor, it is necessary that the electrostrictive element and the vibration member are securely bonded in union. When such a bonding layer exists, a resonant frequency is not constant or $\theta$ is lowered. This is undesirable from the standpoint of the drive efficiency. Further, since a stress is always applied to the bonding layer during the drive, the bonding layer is apt to be peeled off. This is undesirable from the standpoint of durability.

SUMMARY OF THE INVENTION

It is an object of the present invention to provide a vibration wave motor which has a high drive efficiency and a high durability.

It is another object of the present invention to provide a vibration wave motor in which an electrostrictive element is not bonded to a vibration member and which is directly driven by a travelling vibration motor generated in a single electrostrictive element.

It is other object of the present invention to provide a novel structure of electrodes arranged on the electrostrictive element to provide power to the electrostrictive element, and a novel arrangement of the elements.

Other objects of the present invention will be apparent from the following description of the preferred embodiments.

DETAILED DESCRIPTION OF THE PREFERRED EMBODIMENTS

Figure 1:
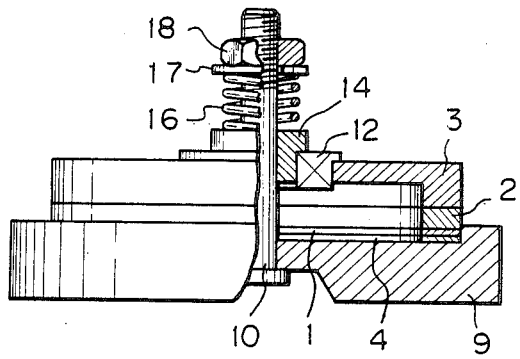
FIG. 1 is a sectional view of a prior art vibration wave motor.
Figure 2:
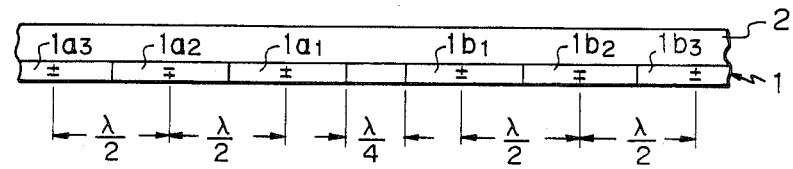
FIG. 2 illustrates polarization of an electrostrictive element of the prior art vibration wave motor shown in FIG. 1, FIG. 3–5D illustrate a principle of drive of the vibration wave motor.
Figure 3:
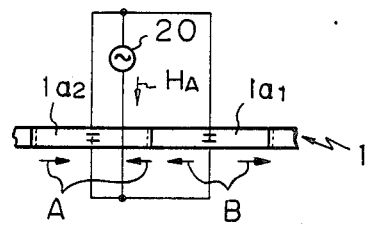
Figure 4A:
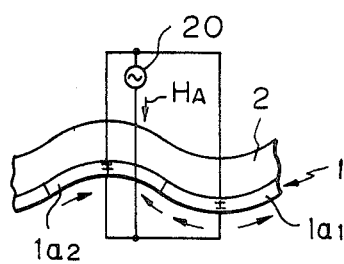
Figure 4B:
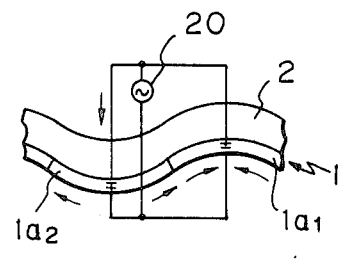
Figure 6:
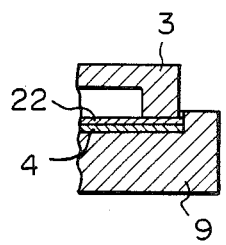
FIG. 6 shows a sectional view of major portions of one embodiment of a vibration wave motor of the present invention.
Figure 7:
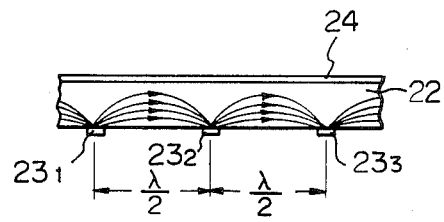
FIG. 7 is a sectional view of an electrostrictive element used in the vibration wave motor shown in FIG. 6.

FIG. 6 show major portions of an embodiment of a vibration wave motor of the present invention. An electrostrictive element 22 is mounted on a base 9 through a vibration absorber 4 to form a stator. A movable member (rotor) 3 is press-contacted to the electrostrictive element 22. The press-contact mechanism is not shown in FIG. 6 but it is identical to that shown in FIG. 1. The electrostrictive element 22 takes place of the electrostrictive element 1 and the vibration member 2 shown in FIG. 1. The movable member 3 in the present embodiment directly contacts to the electrostrictive element 22. The electrostrictive element 22 is constructed as described below. FIG. 7 is a side view illustrating polarization of the electrostrictive element 22. The polarization pitch is identical to the pitch in FIG. 2 but the polarization direction is different. On one side of the electrostrictive element 22, narrow striped electrodes $23_1, 23_2, 23_3, \ldots$ are formed by evaporation at a pitch of one half of the wavelength to cross the width direction (normally to the plane of the drawing). While not shown, electrodes are similarly formed at positions displaced by one quarter of the wavelength. The electrostrictive element is successively polarized through the electrodes $23_1, 23_2, 23_3, \ldots$. When a high D.C. voltage is applied with the electrode $23_1$ being a positive electrode and the electrode $23_2$ being a negative electrode, an electric field shown by arrows in FIG. 7 is established between the electrodes $23_1$ and $23_2$. The electric field has a high electric flux density on the surface of the electrostrictive element 22 on which the electrodes $22_1$ and $22_2$ are mounted and has a low electric flux density on the opposite side. Because the electrostrictive element is polarized under such an electric field, the degrees of polarization on the opposite sides of the electrostrictive element 22 are different from each other. In a similar manner, the polarization is sequentially effected at the electrodes $23_2, 23_3$, the electrodes $23_3$ and $23_4$ and so on.

Figure 8:
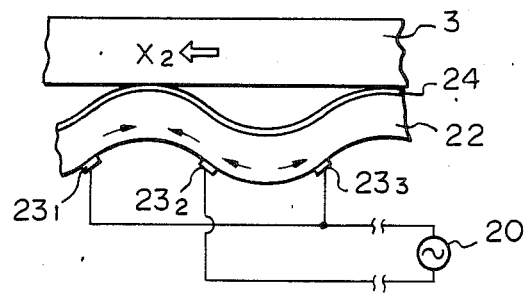
FIG. 8 illustrates a principle of the drive of the electrostrictive element shown in FIG. 7, FIGS. 9A and 9B are a plan view and a sectional view of a second embodiment of the electrostrictive element used in the vibration wave motor shown in FIG. 6.
Figure 5A:
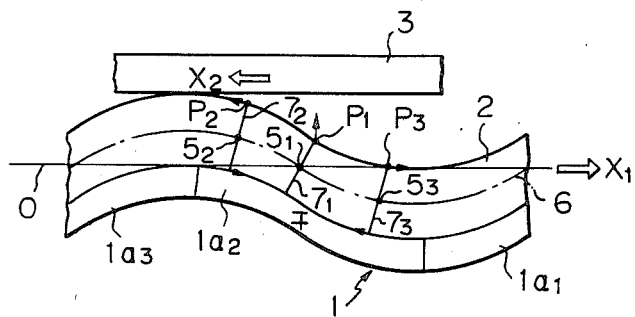
Figure 5B:
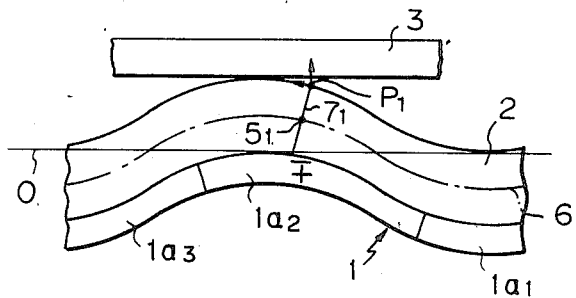
Figure 5C:
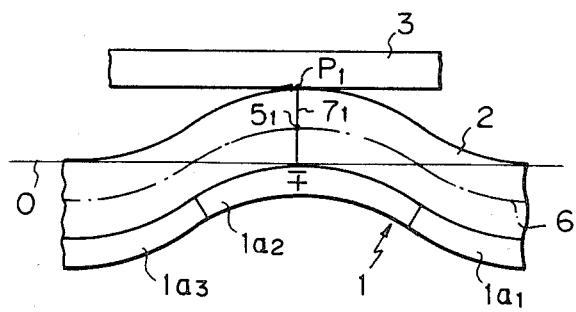
Figure 5D:
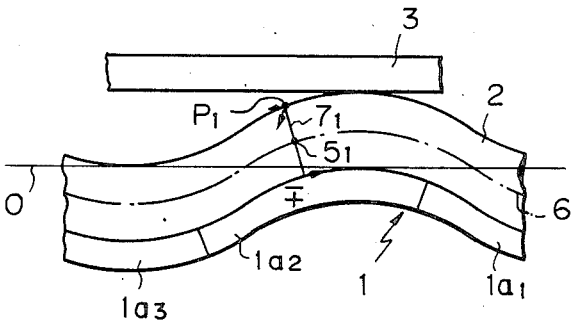

As shown in FIG. 8, an A.C. power supply 20 is connected to the electrodes $23_1, 23_2, 23_3, \ldots$ of the polarized electrostrictive element 22 with alternately opposite polarities. A film 24 for preventing abrasion is preferably arranged on the surface of the electrostrictive element 22 opposite to the surface on which the electrodes are mounted. When a drive voltage is applied to the vibration wave motor by the A.C. power supply 20, the electrostrictive element 22 is bent.

The reason why the electrostrictive element 22 itself is bent is explained as follows. As described above, the electrostrictive element 22 has different degrees of polarization and the electric flux density of the driving electric field is high on the electrode side and low on the opposite side. Accordingly, the expansion (or shrinkage) of the electrostrictive element 22 when the drive voltage is applied is large on the electrode side and small on the opposite side and hence the electrostrictive element 22 is bent. The direction of expansion or shrinkage is identical to the direction of application of the drive voltage (polarization direction) and the above phenomenon is called a longitudinal effect. The electrostrictive element 22 without the vibration plate bends and vibrates sequentially. Since similar bending motions take place at positions displaced by one quarter of wavelength, the vibration wave travels and drives the vibration member 3 in the direction $X_2$.

The structure of the electrostrictive element 22 shown in FIGS. 7 and 8 has been filed by the assignee of the present invention as U.S. Ser. No. 623,334 filed on June 22, 1984. In the present invention, the electrostrictive element of such a structure is directly contacted to the movable element to eliminate the bonding layer. Thus, the drawback due to the bonding layer which bonds the electrostrictive element to the vibration member is resolved and the following advantage is provided. Since the electrodes are arranged on only one side of the electrostrictive element 22, the power can be supplied to the electrostrictive element through the electrodes on that one surface with the movable member being mounted on the other surface of the electrostrictive element. Accordingly, wiring to supply the power to the electrostrictive element is simplified.

Another embodiment of the electrostrictive element is described.

Figures 9A, 9B:
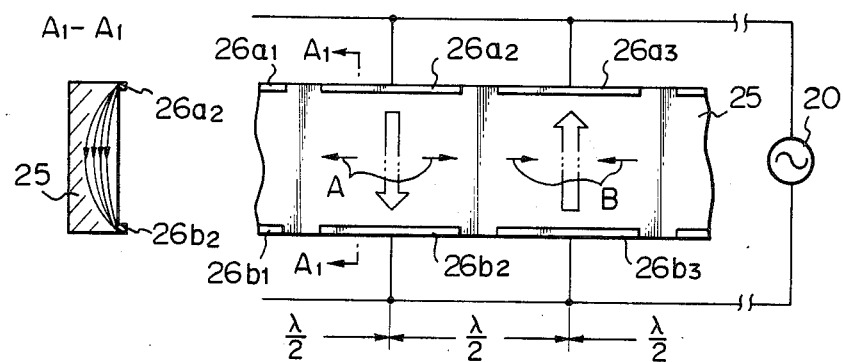

FIG. 9 shows another embodiment of the electrostrictive element. By mounting the electrostrictive element 25 of the present invention in place of the electrostrictive element 1 and the vibration member 2 of FIG. 1, a vibration wave motor is effected. It is different from the previous embodiment in that it is bent by the expansion or shrinkage in a direction traversing the direction of the application of the drive voltage, or by a lateral effect, as is taught by the Japanese Patent Application Laid-Open No. 173912/1983. FIG. 9A shows the electrostrictive element 25 viewed from the bottom (opposite side to the movable member 3) and FIG. 9B is an $A_1$—$A_1$ sectional view thereof. The left side of the electrostrictive element 25 shown in FIG. 9B is a contact surface to the movable member. The electrostrictive element 25 is made of ceramic, and electrodes $26a_1, 26a_2, 26a_3, \ldots$ and electrodes $26b_1, 26b_2, 26b_3, \ldots$ are mounted on the opposite sides of the bottom surface of the electrostrictive element 25 at a pitch of one half of the wavelength. D.C. high voltages are applied with alternately opposite polarity such as electrodes $26a_1 \rightarrow 26b_1$, electrodes $26a_2 \leftarrow 26b_2$, electrodes $26a_3 \rightarrow 26b_3$, electrodes $26a_4 \leftarrow 26b_4, \ldots$ to polarize the ceramic material. It is polarized in directions shown by chain line arrows. The polarized areas exhibit the electrostrictive effect. This electrostrictive element 25 is incorporated in place of the electrostrictive element 22 of the vibration wave motor shown in FIG. 6. As shown in FIG. 9A, the drive voltage is applied by the A.C. power supply 20. Arrows in FIG. 9B show an electric field in the polarization mode or an electric field in the drive mode. The electric flux density is high on the electrode side. Because of the difference in the electric fields, the electrostrictive element 25 is bent.

In the present embodiment, the electrostrictive element 25 is bent by the lateral effect of the expansion/shrinkage (arrows A and B) in the direction traversing to the direction of application of the drive voltage.

Figure 10:
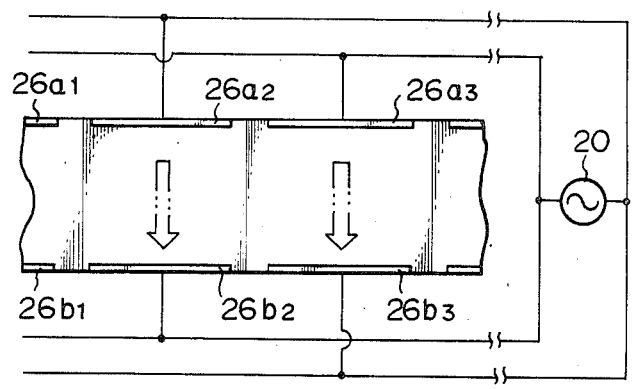
FIG. 10 is a plan view of a third embodiment of the electrostrictive element shown in FIG. 6, FIGS. 11A, 11B and 11C show wiring diagrams and sectional view of a polarized electrostrictive element in accordance with a fourth embodiment.

FIG. 10 shows another embodiment which also utilizes the lateral effect and which is a modification of the embodiment shown in FIG. 9. As shown in FIG. 10, the positions of the electrodes remain unchanged but the polarization directions are the same as shown by chain line arrows and the directions of application of the drive voltage are alternately opposite in the sequence of electrodes.

Figure 11A:
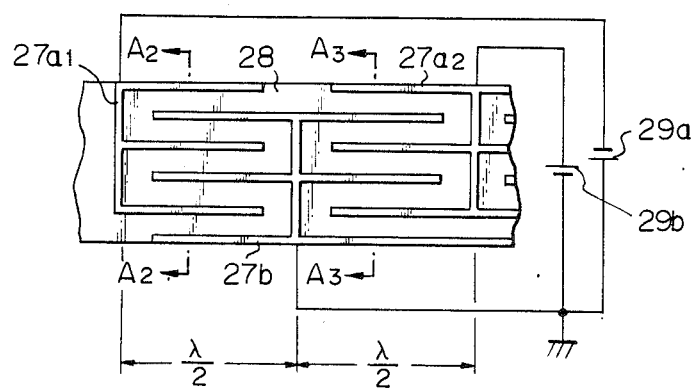
Figure 11C:
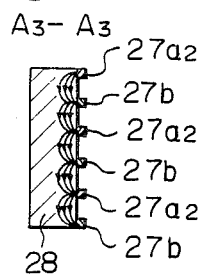
Figure 11B:
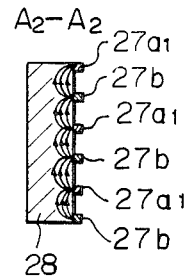
Figure 12:
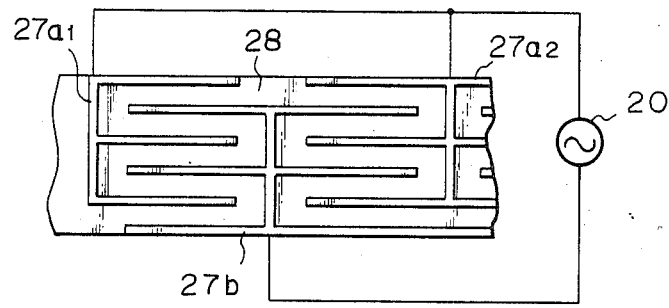
FIG. 12 is a wiring diagram for supplying a power to the electrostrictive element shown in FIG. 11.

FIG. 12 shows another embodiment of the electrostrictive element which also utilizes the lateral effect. FIGS. 11A to 11C illustrate the polarization of the electrostrictive element 28 shown in FIG. 12, in which FIG. 11A is a bottom view, FIG. 11B is an $A_2$—$A_2$ sectional view and FIG. 11C is an $A_3$—$A_3$ sectional view. It is a modification of the embodiment shown in FIG. 9. Comb electrodes $27a_1, 27a_2, 27a_3, \ldots$ and $27b$ are used to shorten the interelectrode distance. The electrode $27b$ is grounded and a high negative power supply $29a$ and a high positive power supply $29b$ are alternately connected to the electrodes $27a_1, 27a_2, 27a_3, \ldots$ Thus, in FIG. 11, the electrostrictive element is polarized such that the adjacently polarized electrostrictive devices are polarized in the opposite directions. Arrows in FIGS. 11B and 11C show electric fields in the polarization mode. When the drive voltage is to be applied, the A.C. power supply 20 is connected in a manner shown in FIG. 12 and the voltages are applied to the electrodes $27a_1, 27a_2, 27a_3, \ldots$ in the same direction. Since the electrostrictive devices which are adjacent to each other in the direction of travel of the travelling vibration wave are polarized oppositely to each other, the expansion/shrinkage takes place alternately oppositely.

Figure 13:
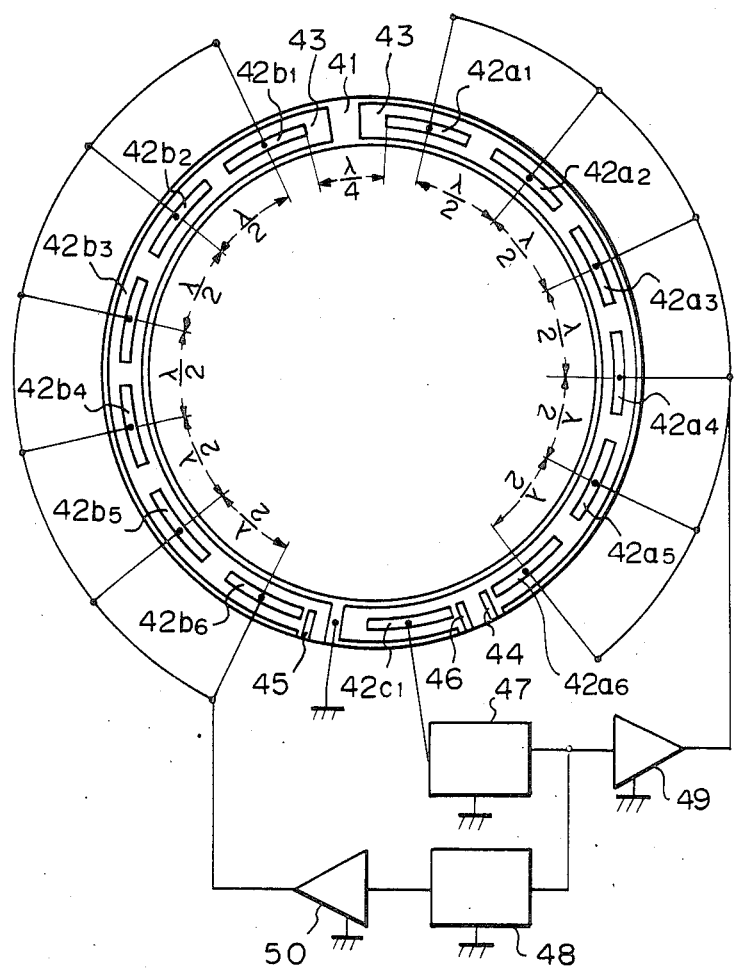
FIG. 13 is a plan view of a fifth embodiment of the electrostrictive element shown in FIG. 6.

FIG. 13 shows a bottom plan view (viewed from the opposite side to the surface which contacts the movable member) of a electrostrictive element which makes the bending motion by the lateral effect to generate the travelling vibration wave in the same manner as the electrostrictive elements shown in FIGS. 9, 10 and 12.

In FIG. 13, numeral 41 denotes a non-electrode area or an insulation area of the electrostrictive element and numeral 42 denotes electrodes mounted on the electrostrictive element. A first group of electrodes $42a_1$–$42a_6$ and a second group of electrodes $42b_1$–$42b_6$ are arranged at a pitch of one half of the wavelength and the first group of electrodes are displaced from the second group of electrodes by one quarter of wavelength.

Figure 14:
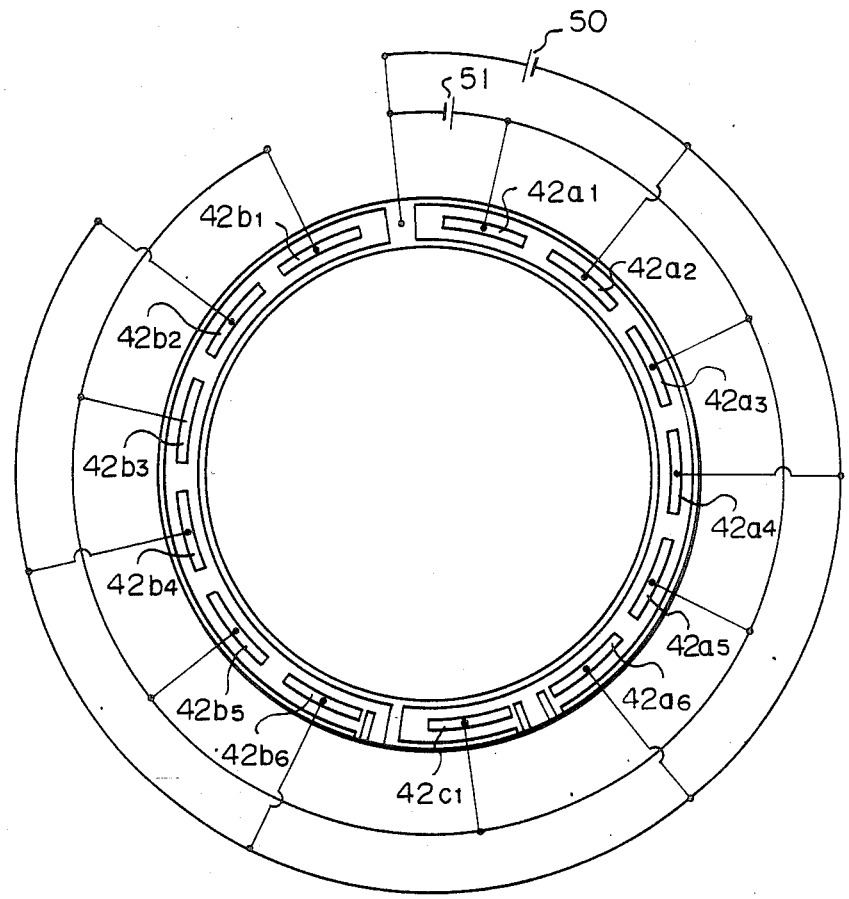
FIG. 14 is a wiring diagram for polarizing the electrostrictive element shown in FIG. 13.

FIG. 14 shows a wiring diagram for polarizing the electrostrictive devices such that adjacent ones are oppositely polarized. Numerals 50 and 51 denote high voltage power supplies. The electrostrictive element is polarized by those power supplies such that adjacent ones of the electrostrictive devices in the direction of travel of the travelling vibration wave are oppositely polarized. Numeral $42c_1$ denotes an electrode for feeding a change of impedance of the electrostrictive element back to an oscillation circuit 47. Numeral 48 denotes a 90°-phase shifter which supplies periodic voltages having a phase difference of 90 degrees to the first group of electrode and the second group of electrode. Numerals 49 and 50 denote amplifiers which amplifies the output of the oscillation circuit 47 to a necessary level.

Figure 15:
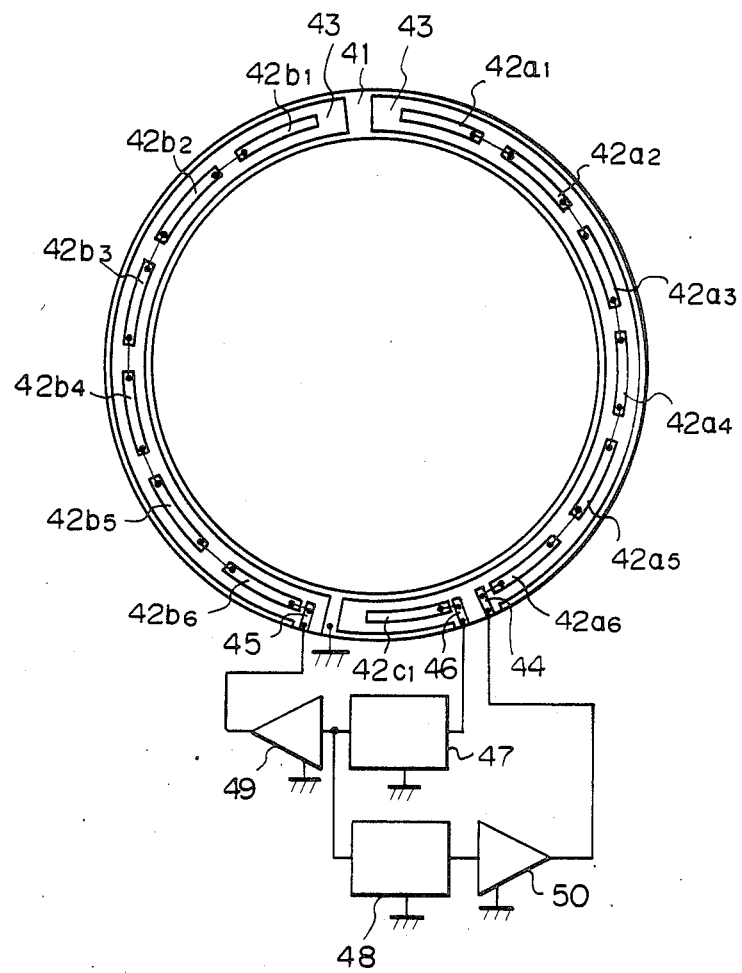
FIG. 15 is a wiring diagram for supplying a power to the electrostrictive element shown in FIG. 13.

FIG. 15 is a plan view of electrode wiring in the embodiment of FIG. 14. Numerals 44, 45 and 46 denote terminal electrodes to the external.

In the present embodiment, since the adjacent ones of the electrostrictive devices in the direction of travel of the travelling vibration wave are oppositely polarized, the travelling vibration wave can be generated in the electrostrictive element with simple wiring as shown in FIG. 15 and with a simple construction.

The structure of the electrodes which makes the bending motion by the lateral effect, shown in FIGS.

9–15 is disclosed in the Japanese Patent Application Laid-Open No. 173912/1983. In the present embodiment, in order to efficiently generate the travelling vibration wave by utilizing the bending motion due to the lateral effect, a plurality of such electrode structures which create the lateral effect are continuously arranged at a predetermined pitch as shown in FIG. 13, and adjacent ones of the electrostrictive devices in the direction of travel of the travelling vibration wave are oppositely polarized to simplify the wiring for supplying the power to the electrostrictive element. It is not necessary to contact the movable member to the electrostrictive element in order to attain the above effect.

Figure 16:
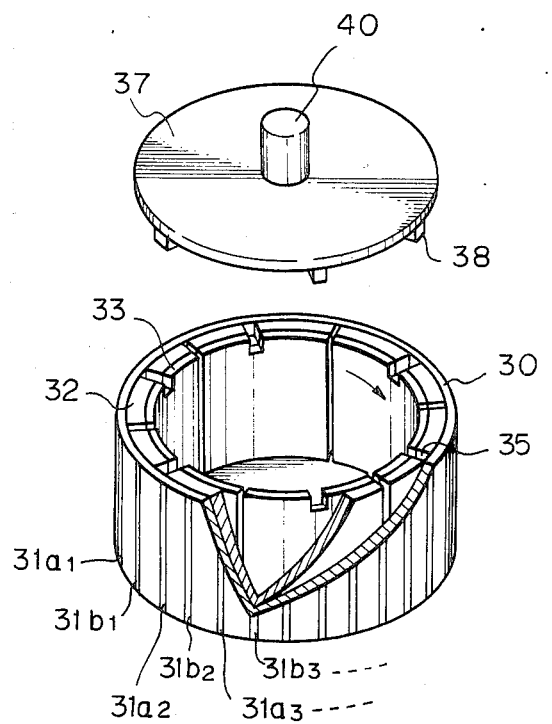
FIG. 16 is a perspective view of an embodiment applied to a rotary motor.

FIG. 16 is a perspective view, partly cut away, of an embodiment of the present invention applied to a radial drive type vibration wave motor. Numeral 30 denotes an electrostrictive element around which electrodes $31a_1$ and $31b_1$, electrodes $31a_2$, and $31b_2$, electrodes $31a_3$ and $31b_3$, . . . are mounted in facing relation. The electrostrictive element is polarized by those electrodes as is done in the embodiment of FIG. 7, and the driving A.C. voltage is applied thereto. The electrostrictive element 30 makes the bending motion by the longitudinal effect in the same manner as the electrostrictive element shown in FIG. 7. An anti-abrasion film is applied on the inner side of the electrostrictive element 30. Numeral 32 denotes a rotor which comprises plastic magnets each having one-sixth of a cylinder. They are bonded to the inner side of the magnet rotor 32. Recesses 35 are formed at tops of the rotors 32 and 33. Numeral 37 denotes a rotary disk which has six projections 38 engaging with the recesses 35. Numeral 40 denotes a rotary shaft. The outer periphery of the electrostrictive element 30 is covered with a vibration absorber (not shown) and the entire motor is housed in a housing. The electrostrictive element 30 makes the bending vibration radially by the longitudinal effect of the expansion/shrinkage, and the vibration wave travels circumferencially. The inner magnet (stator) of the electrostrictive element 30 and the rotors 32 and 33 attract each other so that the rotors 32 and 33 are driven and the shaft 40 is rotated with the rotary disk 37. In the present embodiment, since the electrostrictive element directly contacts the rotor, no bonding layer is required on the vibration area.

As described hereinabove, the vibration wave motor of the present invention requires no bonding layer on the vibration area and hence the drive efficiency is very high and the durability is high. Because the vibration plate is not necessary, the structure is compact and the manufacturing cost is reduced.

The present invention is applicable not only to a rotary motor but also to a linear motor.

In the above explanation, although this motor is driven by the vibration of the electrostrictive elements, it appears that piezoelectric elements having a piezoelectric effect, especially reversed effect, may be used for the drive of the motor as the electrostrictive elements.

What is claimed is:

1. A motor comprising:
   (a) an electro-mechanical energy converting element for generating a travelling vibration wave;
   (b) a pair of electrodes formed on said electro-mechanical energy converting element and extending in a direction parallel with the advancing direction of said travelling vibration wave, said travelling vibration wave being generated by the application of AC voltages which have relatively different phases, to said pair of electrodes; and
   (c) a movable element contacting said electro-mechanical energy converting element and driven by said travelling vibration wave.

2. A motor according to claim 1, further comprising an anti-abrasion film formed where said movable element and said electro-mechanical converting element are in contact with each other.

3. A motor according to claim 1, wherein said electro-mechanical converting element has a first surface on which the electrodes are located and a second surface free of electrodes, and an anti-abrasion film formed on said second surface.

4. A motor according to claim 1, wherein said electro-mechanical energy converting element is ring-shaped.

* * * * *

UNITED STATES PATENT AND TRADEMARK OFFICE
CERTIFICATE OF CORRECTION

PATENT NO. : 4,678,956

DATED : July 7, 1987

INVENTOR(S) : KAZUHIRO IZUKAWA, ET AL.

It is certified that error appears in the above-identified patent and that said Letters Patent is hereby corrected as shown below:

COLUMN 1

Line 50, "is" should read --as--.

COLUMN 2

Line 8, "$1b_1$ $1b_2$," should read --$1b_1$, $1b_2$,--.
    Lines 34-5, "$7_3$; and normal" should read --$7_3$ normal--.
    Line 36, "crossing line 5," should read
        --crossing lines $5_1$, $5_2$, $5_3$,--.
    Line 41, "is a" should read --is at--.

COLUMN 3

Line 1, "drives" should read --drive--.
    Line 10, "shrinked is expanded or shrinked" should
        read --shrunk is expanded or shrunk--.
    Line 46, "Fig. 3-5D" should read --Figs, 3-5D--.
    Line 57, "view of " should read --view, respectively,
        of--.

COLUMN 4

Line 10, "show" should read --shows--.
    Line 17, "place" should read --the place--.

UNITED STATES PATENT AND TRADEMARK OFFICE
CERTIFICATE OF CORRECTION

PATENT NO. : 4,678,956
DATED : July 7, 1987
INVENTOR(S) : KAZUHIRO IZUKAWA, ET AL.

It is certified that error appears in the above-identified patent and that said Letters Patent is hereby corrected as shown below:

COLUMN 5

Line 44, "D.C. high" should read --High D.C.--.

COLUMN 6

Line 30, "of a" should read --of an--.
    Line 54, "electrode" (both occurrences) should read --electrodes--.
    Line 55, "amplifies" should read --amplify--.

Signed and Sealed this

Second Day of February, 1988

Attest:

DONALD J. QUIGG

Attesting Officer      Commissioner of Patents and Trademarks